July 9, 1935. J. L. DRAKE 2,007,796
SHEET GLASS SCORING APPARATUS
Filed Sept. 16, 1929
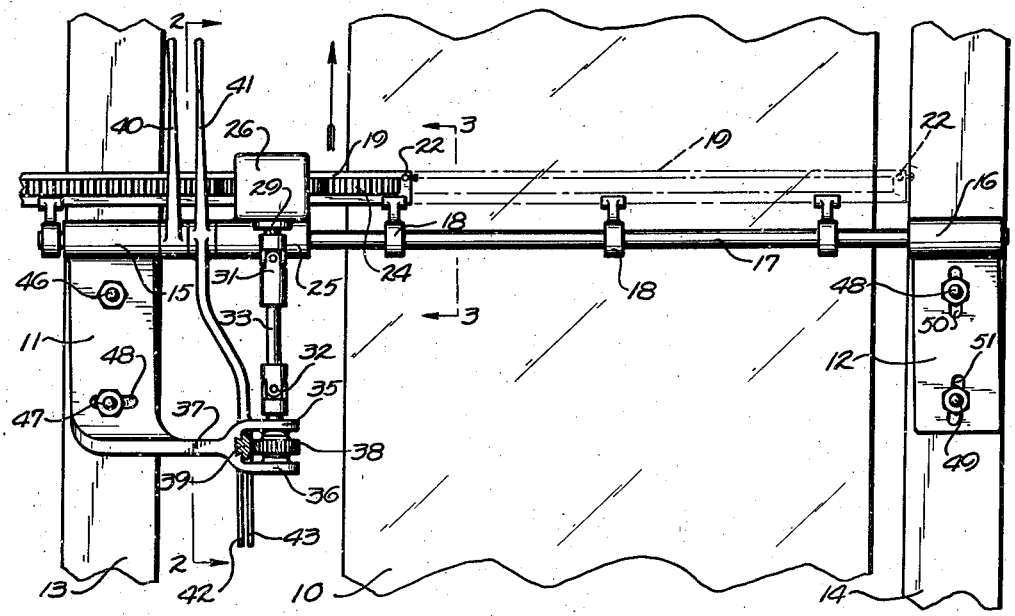
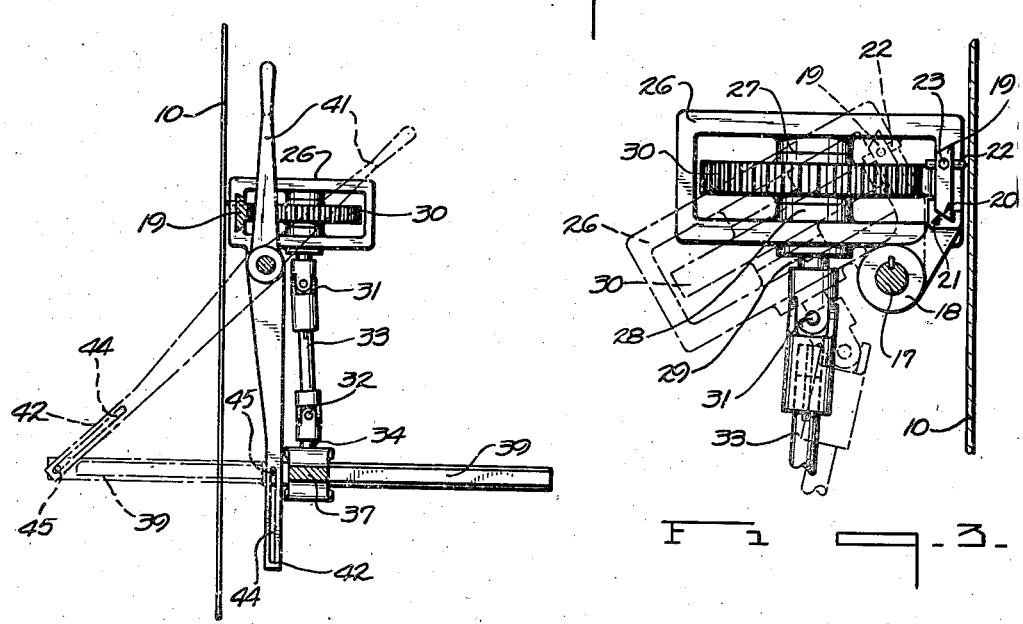
Inventor
John L. Drake
By Frank Fraser,
Attorney Patented July 9, 1935

2,007,796

UNITED STATES PATENT OFFICE 2,007,796

SHEET GLASS SCORING APPARATUS

John L. Drake, Toledo, Ohio, assignor to Libbey-Owens-Ford Glass Company, Toledo, Ohio, a corporation of Ohio Application September 16, 1929, Serial No. 392,779

8 Claims. (Cl. 33—32)

This invention relates broadly to cutting apparatus and particularly to an apparatus for cutting or scoring sheet glass.

An object of the invention is the provision of apparatus for cutting or scoring a continuously formed sheet of glass transversely during movement thereof preferably in a generally vertical direction.

Another object of the invention is the provision of cutting apparatus of the above stated character which can be conveniently and rapidly operated and which will insure the proper cutting of the sheet along the desired line at substantially right angles to its direction of travel.

Other objects and advantages of the invention will become more apparent during the course of the following description when taken in connection with the accompanying drawing.

In the drawing forming a part of this application and wherein like numerals are employed to designate like parts throughout the same, Fig. 1 is a front elevation of cutting apparatus provided by the present invention, Fig. 2 is a section taken substantially on line 2—2 of Fig. 1, and Fig. 3 is a section taken substantially on line 3—3 of Fig. 1.

Referring to the drawing, 10 designates a glass sheet which is being continuously generated from a glass bath and moved vertically by a mechanism not illustrated and which constitutes no part of the present invention.

The cutting or scoring means herein provided comprises a pair of brackets 11 and 12 carried by the vertical uprights or supports 13 and 14 respectively positioned at opposite edges of the sheet 10. Slidably mounted within the bearing portions 15 and 16 formed at the upper ends of brackets 11 and 12 is a shaft 17 which extends transversely across the sheet 10. Carried by shaft 17 at a plurality of spaced points are the stationary guide members 18 which slidably support a cutter carrying bar 19 upon their upper ends, said bar having a bevelled lower edge 20 adapted to slide in correspondingly shaped ways 21 in the guides 18 (Fig. 3). The bar 19 carries at its inner end a cutting tool 22 removably secured in place by set screw 23, said tool consisting either of the usual diamond or a rotatable steel wheel. Formed upon the outer face of the bar 19 are the vertically disposed rack teeth 24.

Fixed to the shaft 17, adjacent one edge of the sheet 10, is a sleeve 25 carrying a substantially rectangular frame 26 through which the rack bar 19 is slidable, said frame having the superimposed bearings 27 and 28 within which is journaled the vertical shaft 29. Mounted upon shaft 29 and interposed between bearings 27 and 28 is a gear 30, the teeth of which are adapted to mesh with the teeth 24 on bar 19. The vertical shaft 29 is connected by means of the flexible couplings 31 and 32 and intermediate shaft 33 to a vertical shaft 34 journaled in the spaced horizontal legs 35 and 36 which are formed at the outer end of the laterally projecting portion 37 of bracket 11. Mounted upon shaft 34 between legs 35 and 36 is a gear 38 adapted to mesh with a rack bar 39 slidably carried by the projecting portion 37 of bracket 11.

Keyed to the shaft 17 is a lever 40 and upon rocking of said lever in a predetermined direction, the cutting tool 22 is adapted to be moved into cutting position to engage the glass sheet 10. The apparatus is so counter-balanced that upon the release of lever 40, the frame 26, rack bar 19 and associated parts will fall or rock rearwardly to the position indicated by the broken lines in Fig. 3 whereby to move the cutting tool out of cutting position. When it is desired to score the sheet, the lever 40 must be pushed inwardly to move the frame 26, rack bar 19 and associated parts to their cutting position as indicated by the full lines in Fig. 3 and the lever 40 must be held in such position during the cutting operations as will be more clearly hereinafter apparent.

Loosely mounted intermediate its ends upon the shaft 17 is a lever 41, the lower end thereof being provided with spaced legs 42 and 43 adapted to straddle the rack bar 39. Each leg 42 and 43 has a longitudinally extending slot 44 therein adapted to receive one end of a pin 45 carried at one end of rack bar 39.

In operation, when it is desired to score the glass sheet 10 and assuming that the cutting mechanism is positioned to the left as illustrated in Fig. 1, the lever 40 is first pushed inwardly to move the cutting tool 22 into operative cutting position with respect to the glass sheet, after which the operator, while still holding lever 40 inwardly with one hand, grasps lever 41 with his other hand and rocks the same upon shaft 17 by pulling the upper end thereof outwardly. Upon rocking of the lever 41 in this manner, the rack bar 39 will be moved in the direction of its length as indicated by the broken lines in Fig. 2 and such movement will serve to rotate gear 38, which in turn will effect rotation of gear 30 and cause travel of rack bar 19 transversely across the sheet with the cutting tool in engagement therewith to make the desired score. After the score has been made the lever 40 is released by the operator so as to allow the cutting tool to move away from the sheet after which the lever 41 is rocked in the opposite direction to return the cutting tool to its starting position at the left of the sheet.

In order that the score line will extend at right angles to the direction of travel of the sheet, the shaft 17 and cutter carrying bar 19 are not positioned exactly horizontal but, on the other hand, are somewhat inclined as illustrated in Fig. 1 to compensate for the movement of the sheet. Should the speed of travel of the sheet be changed, the angle of the cutting means must be varied accordingly and to provide for this adjustment, the bracket member 11 is secured to the support 13 by the fastening elements 46 and 47, the latter fastening element operating within a slot 48 so that the bracket may be swung about element 46. Likewise, the bracket 12 is secured to support 14 by the fastening elements 48 and 49 which operate in slots 50 and 51 respectively.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination with means for continuously drawing a sheet of glass vertically, means for scoring the sheet during the vertical movement thereof including a substantially horizontally disposed non-rotatable but slidable rack bar arranged transversely of the sheet, fixed means for guidingly supporting said rack bar, a cutting tool secured to the rack bar adjacent one end thereof, and means for sliding said rack bar bodily longitudinally to move the cutting tool across the sheet and in contact therewith.

2. In combination with means for continuously drawing a sheet of glass vertically, means for scoring the sheet during vertical movement thereof including a substantially horizontally disposed non-rotatable but slidable rack bar arranged transversely of the sheet, a cutting tool carried adjacent one end thereof, and means for sliding said rack bar bodily longitudinally to carry the cutting tool across the sheet and in contact therewith, said last-mentioned means including a pivotally mounted operating lever and operative connections between said lever and rack bar.

3. In apparatus for scoring a continuously moving sheet of glass, a substantially horizontally disposed rack bar arranged transversely of the sheet, a cutting tool carried adjacent one end thereof, means for moving said rack bar bodily longitudinally to carry the cutting tool across the sheet and in contact therewith, means for counterbalancing said rack bar and cutting tool so that the cutting tool is normally urged in one direction out of cutting position, and means for moving the rack bar in the opposite direction to bring said cutting tool into operative cutting position.

4. In apparatus for scoring a continuously moving sheet of glass, a substantially horizontally disposed rack bar arranged transversely of the sheet, a cutting tool carried adjacent one end thereof, and means for moving said rack bar bodily longitudinally to carry the cutting tool across the sheet and in contact therewith, said last-mentioned means including a rockable operating lever and operative connections between said lever and rack bar, means for counter-balancing said rack bar and cutting tool so that the cutting tool is normally urged in one direction out of cutting position, and means for moving the rack bar in the opposite direction to bring said cutting tool into operative cutting position.

5. In combination with means for continuously drawing a sheet of glass vertically, means for scoring the sheet during vertical movement thereof including a substantially horizontally disposed shaft extending transversely across the sheet, fixed guide means carried by said shaft, a non-rotatable rack bar slidably supported upon said guide means, a cutting tool carried adjacent one end thereof, and means for sliding said rack bar bodily longitudinally upon said guide means to carry the cutting tool across the sheet and in contact therewith.

6. In combination with means for continuously drawing a sheet of glass vertically, means for scoring the sheet during vertical movement thereof including a substantially horizontally disposed shaft extending transversely across the sheet, fixed guide means carried by said shaft, a non-rotatable rack bar slidably supported upon said guide means, a cutting tool carried adjacent one end thereof, and means for sliding said rack bar bodily longitudinally upon said guide means to carry the cutting tool across the sheet and in contact therewith, said last-mentioned means including an operating lever pivotally mounted upon said shaft and operative connections between said lever and rack bar.

7. In apparatus for scoring a continuously moving sheet of glass, a substantially horizontally disposed rockable shaft extending transversely across the sheet, fixed guide means carried by said shaft, a rack bar slidably supported upon said guide means, a cutting tool carried adjacent one end thereof, means for moving said rack bar bodily longitudinally to carry the cutting tool across the sheet and in contact therewith, means for counter-balancing said rack bar and cutting tool so that the cutting tool is normally urged out of cutting position, and a lever mounted upon said shaft and adapted to be grasped by the operator when it is desired to effect rocking of said shaft to move said cutting tool into operative cutting position.

8. In apparatus for scoring a continuously moving sheet of glass, a substantially horizontally disposed rockable shaft extending transversely across the sheet, fixed guide means carried by said shaft, a rack bar slidably supported upon said guide means, a cutting tool carried adjacent one end thereof, and means for moving said rack bar bodily longitudinally to carry the cutting tool across the sheet and in contact therewith, said last-mentioned means including an operating lever rockably mounted upon said shaft, and operative connections between said lever and rack bar, means for counter-balancing said rack bar and cutting tool so that the cutting tool is normally urged out of cutting position, and a second lever mounted upon said shaft and adapted to be grasped by the operator when it is desired to effect rocking of said shaft to move said cutting tool into operative cutting position.

JOHN L. DRAKE.